United States Patent [19]

Bottomley et al.

[11] Patent Number: 5,550,809

[45] Date of Patent: Aug. 27, 1996

[54] MULTIPLE ACCESS CODING USING BENT SEQUENCES FOR MOBILE RADIO COMMUNICATIONS

[75] Inventors: Gregory E. Bottomley, Cary, N.C.; Paul W. Dent, Stehag, Sweden

[73] Assignee: Ericsson GE Mobile Communications, Inc., Research Triangle Park, N.C.

[21] Appl. No.: 291,693

[22] Filed: Aug. 16, 1994

Related U.S. Application Data

[63] Continuation-in-part of Ser. No. 866,865, Apr. 10, 1992, Pat. No. 5,353,352.

[51] Int. Cl.[6] ............................................. H04J 13/00
[52] U.S. Cl. ........................... 370/18.000; 370/22.000; 375/205.000
[58] Field of Search ................................. 370/18, 100.1, 370/20, 21, 19, 22, 23, 50, 95.1, 95.2, 95.3, 85.7; 375/200, 205, 238, 242, 353, 367, 343, 286; 380/34, 46, 47, 28; 341/178, 81; 455/38.1

[56] References Cited

U.S. PATENT DOCUMENTS

| | | | |
|---|---|---|---|
| 4,052,565 | 10/1977 | Baxter et al. | 380/28 |
| 4,134,071 | 1/1979 | Ohnsorge | 375/200 |
| 4,293,953 | 10/1981 | Gutleber | 375/242 |
| 4,455,662 | 6/1984 | Gutleber | 375/242 |
| 4,470,138 | 9/1984 | Gutleber | 370/18 |

(List continued on next page.)

FOREIGN PATENT DOCUMENTS

| | | |
|---|---|---|
| 336832 | 10/1989 | European Pat. Off. |
| 565506 | 10/1993 | European Pat. Off. |
| 2172777 | 9/1986 | United Kingdom. |
| 2125654 | 3/1994 | United Kingdom. |
| WO92/00639 | 1/1992 | WIPO. |

OTHER PUBLICATIONS

Bottomley, "Signature Sequence Selection in a CDMA System with Orthogonal Coding," IEEE Trans. on Veh. Tech., vol. 42, No. 1, pp. 62–68 (Feb. 1993).

Gilhousen et al., "On the Capacity of a Cellular CDMA System," IEEE Trans. on Veh. Tech., vol. 40, No. 2, pp. 303–312 (May 1991).

A. Kerdock, "A Class of Low-Rate Nonlinear Binary Codes", Information and Control, vol. 20, pp. 182–187 (1972).

Ryuji Kohno et al., "Adaptive Cancellation of Interference in Direct-Sequence Spread-Spectrum Multiple Access Systems," *Proceedings of the IEEE/IEICE Global Telecommunications Conference*, vol. 1, Nov. 15–18, 1987, pp. 630–634.

(List continued on next page.)

*Primary Examiner*—Douglas W. Olms
*Assistant Examiner*—Dang Ton
*Attorney, Agent, or Firm*—Burns, Doane, Swecker & Mathis, L.L.P.

[57] ABSTRACT

Information symbols spread using orthogonal or bi-orthogonal codewords are assigned a unique scramble mask that is taken from a set of scramble masks having selected correlation properties. The set of scramble masks is selected such that the correlation between the modulo-2 sum of two scramble masks with any codeword is a constant magnitude, independent of the codeword and the individual masks being compared. In one embodiment, when any two masks are summed using modulo-2 arithmetic, the Walsh transformation of that sum results in a maximally flat Walsh spectrum. For cellular radio telephone systems using subtractive CDMA demodulation techniques, a two-tier ciphering system ensures security at the cellular system level by using a pseudorandomly generated code key to select one of the scramble masks common to all of the mobile stations in a particular cell. Also, privacy at the individual mobile subscriber level is ensured by using a pseudorandomly generated ciphering key to encipher individual information signals before the scrambling operation.

50 Claims, 10 Drawing Sheets

U.S. PATENT DOCUMENTS

| | | | |
|---|---|---|---|
| 4,568,915 | 2/1986 | Guntleber | 341/81 |
| 4,644,560 | 2/1987 | Torre et al. | 375/205 |
| 4,901,307 | 2/1990 | Gilhousen et al. | 370/18 |
| 4,930,139 | 5/1990 | Chandler et al. | |
| 4,930,140 | 5/1990 | Cripps et al. | 375/205 |
| 4,933,952 | 6/1990 | Albrieux et al. | 375/200 |
| 4,984,247 | 1/1991 | Kaufmann et al. | 375/200 |
| 5,022,049 | 6/1991 | Abrahamson et al. | 375/200 |
| 5,048,059 | 9/1991 | Dent | 375/340 |
| 5,056,109 | 10/1991 | Gilhousen et al. | 375/205 |
| 5,091,942 | 2/1992 | Dent | 380/46 |
| 5,101,501 | 3/1992 | Gilhousen et al. | 455/33.2 |
| 5,103,459 | 4/1992 | Gilhousen et al. | 375/205 |
| 5,109,390 | 4/1992 | Gilhousen et al. | 375/205 |
| 5,128,959 | 7/1992 | Bruckert | 370/18 |
| 5,151,919 | 9/1992 | Dent | 375/205 |
| 5,237,586 | 8/1993 | Bottomley | 375/205 |
| 5,305,349 | 4/1994 | Dent | 375/205 |
| 5,353,352 | 10/1994 | Dent et al. | 380/37 |
| 5,357,454 | 10/1994 | Dent | 364/727 |

OTHER PUBLICATIONS

F. MacWilliams, *The Theory of Error–Correcting Codes, Part I and II*, New York: North–Holland, 1988, pp. 93–124, 451–465.

Tatsuro Masamura, "Spread Spectrum Multiple Access System with Intrasystem Interference Cancellation," *Transactions of the Institute of Electronics, Information & Communication Engineers*, vol. E 71, No. 3, Mar. 1988, pp. 224–31.

P. Monsen, "Fading Channel Communications", IEEE Communications Magazine, Jan. 1980, pp. 16–25.

R. Price et al., "A Communication Technique for Multipath Channels", Proceedings of the IRE, Mar. 1958, pp. 555–570.

Proakis, *Digital Communications*, 2nd Ed., pp. 220–234, 362–365, 593–602, 610–624, 728–739, New York: McGraw–Hill, 1989.

Scholtz, "Origins of Spread–Spectrum Communications", IEEE Transactions on Communications, vol. COM–30, No. 5, May 1982, pp. 18–21.

Stremler, F. G., *Introduction to Cummunication Systems*, Massachusetts: Addison–Wesley Publishing Co., 1982, pp. 406–418.

Tzannes, N.S., *Communication and Radar Systems*, New Jersey: Prentice–Hall, Inc., 1985, pp. 227–239.

G. Turin, "Indroduction to Spread–Spectrum Antimultipath Techniques and Their Application to Urban Digital Radio", Proceedings of the IEEE, vol. 68, No. 3, Mar. 1980.

A Viterbi, "Very Low Rate Convolutional Codes for Maximum Theoretical Performance of Spread–Spectrum Multiple–Access Channels," IEEE Journal on Selected Areas in Communications, vol. 8, No. 4, May 1990.

Mahesh K. Varanasi et al., "An Iterative Detector for Asynchronous Spread–Spectrum Multiple–Access Systems," *Proceedings of the IEEE Global Telecommunicaions Conference, vol. 1, Nov. 28–Dec. 1, 1988, pp. 556–60.*

Yue, "Spread Spectrum Mobile Radio, 1977–1982," IEEE Trans. on Veh. Tech., vol. VT–32, No. 1, pp. 98–105 (Feb. 1983).

A. K. Elhakeem et al., "Modifield Sugar/Ds: A New CDMA Scheme," *IEEE Journal on Selected Areas in Communications, vol. 10, No. 4, pp. 690–704 (May 1992).*

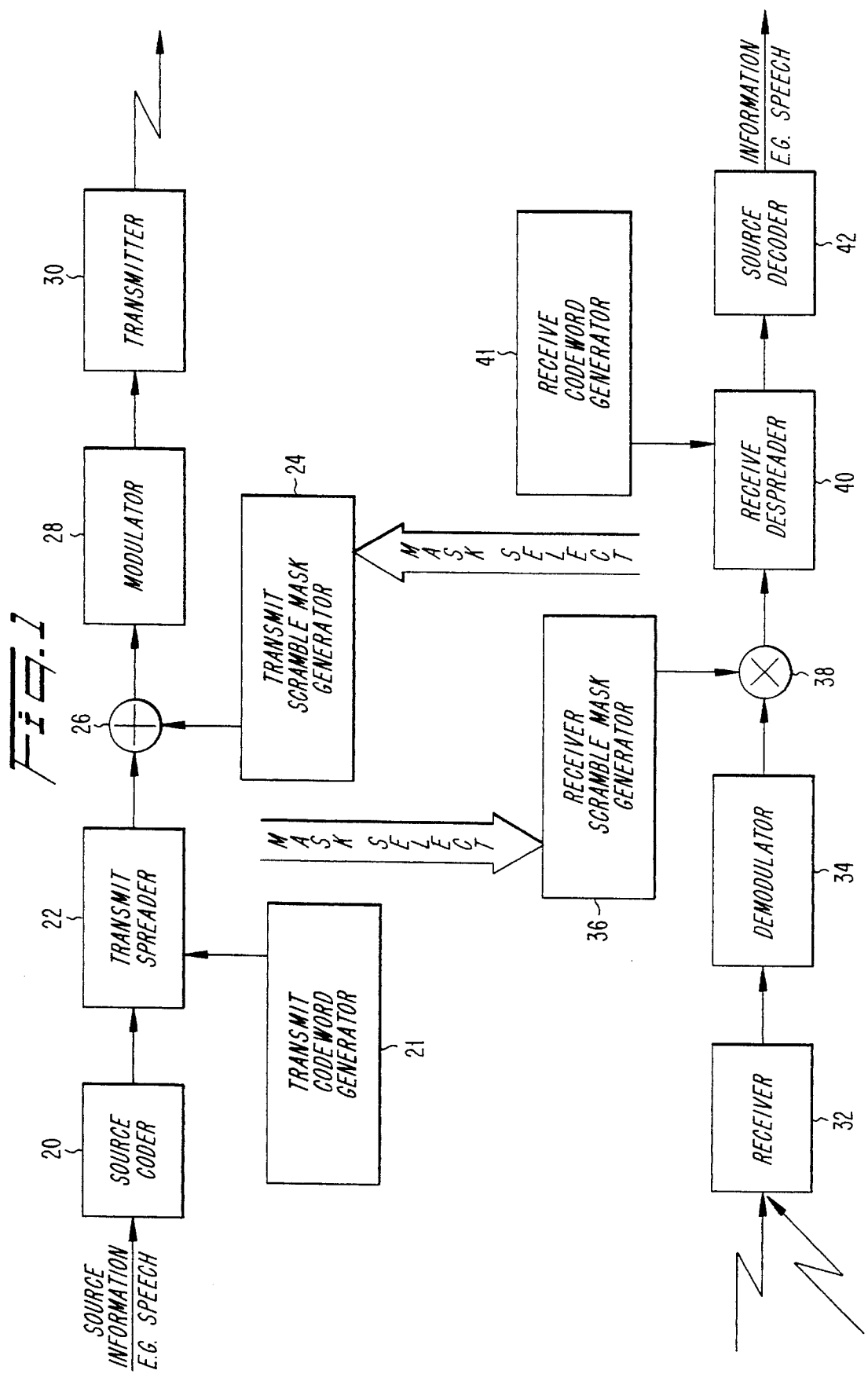

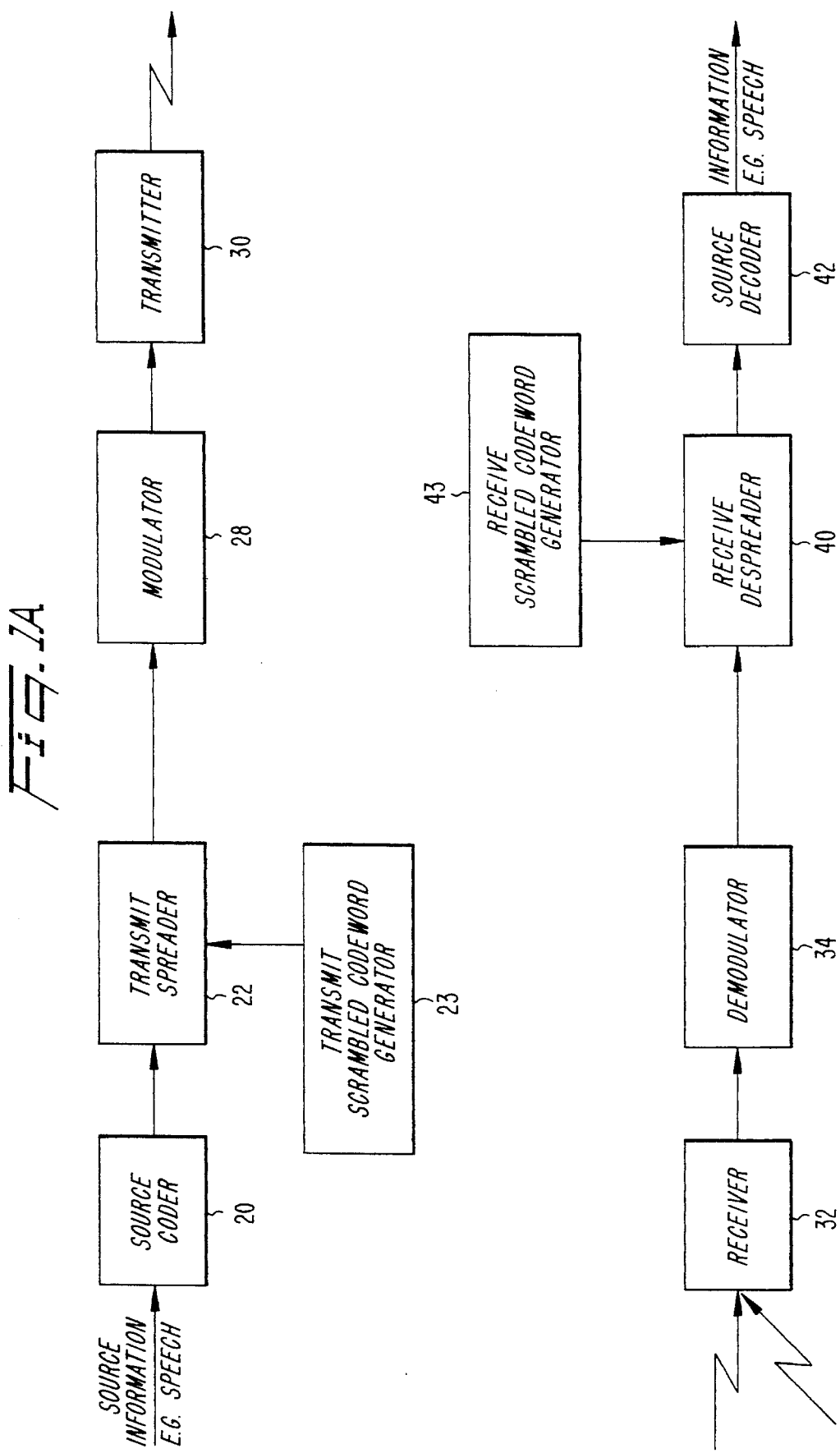

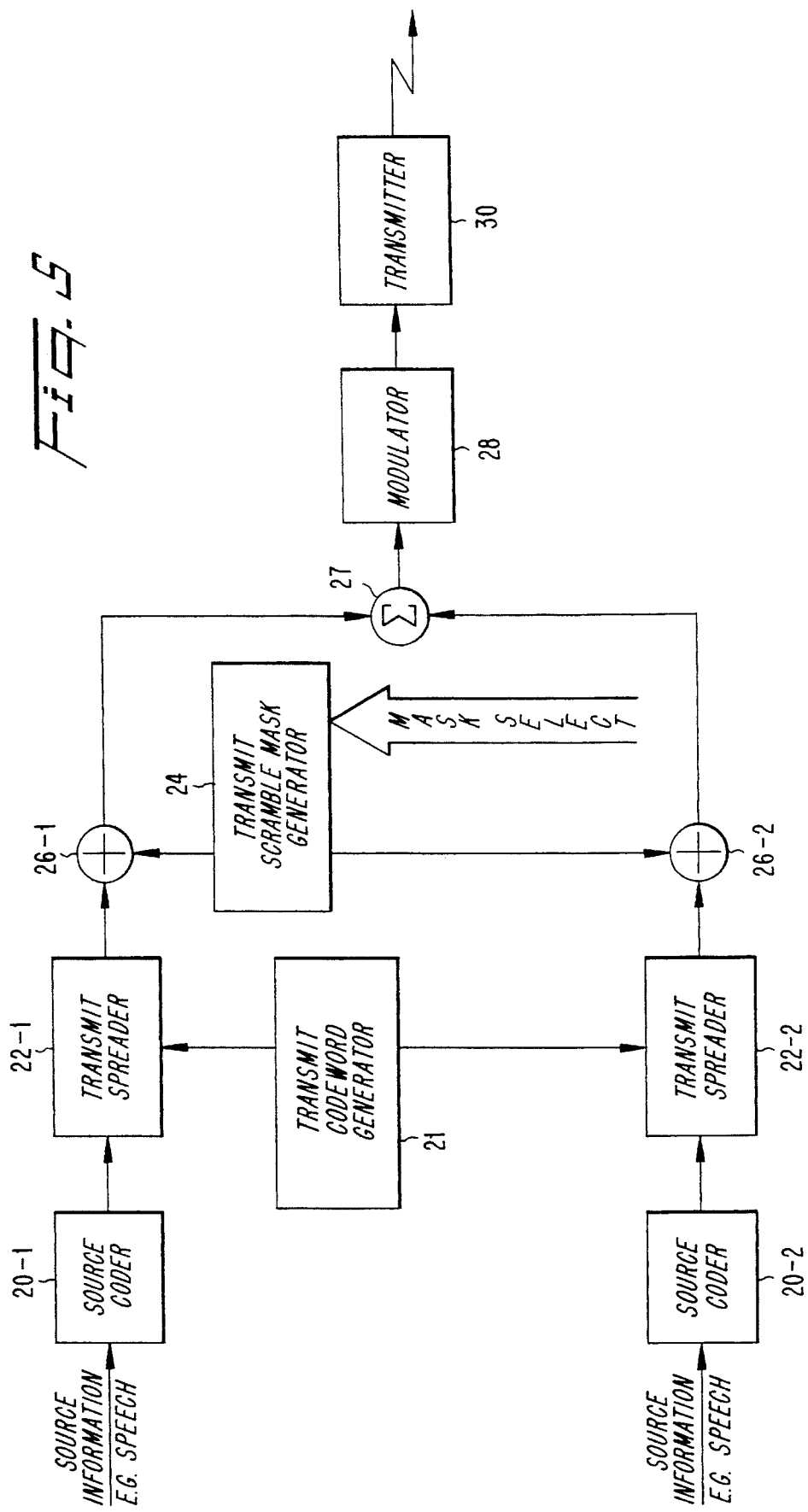

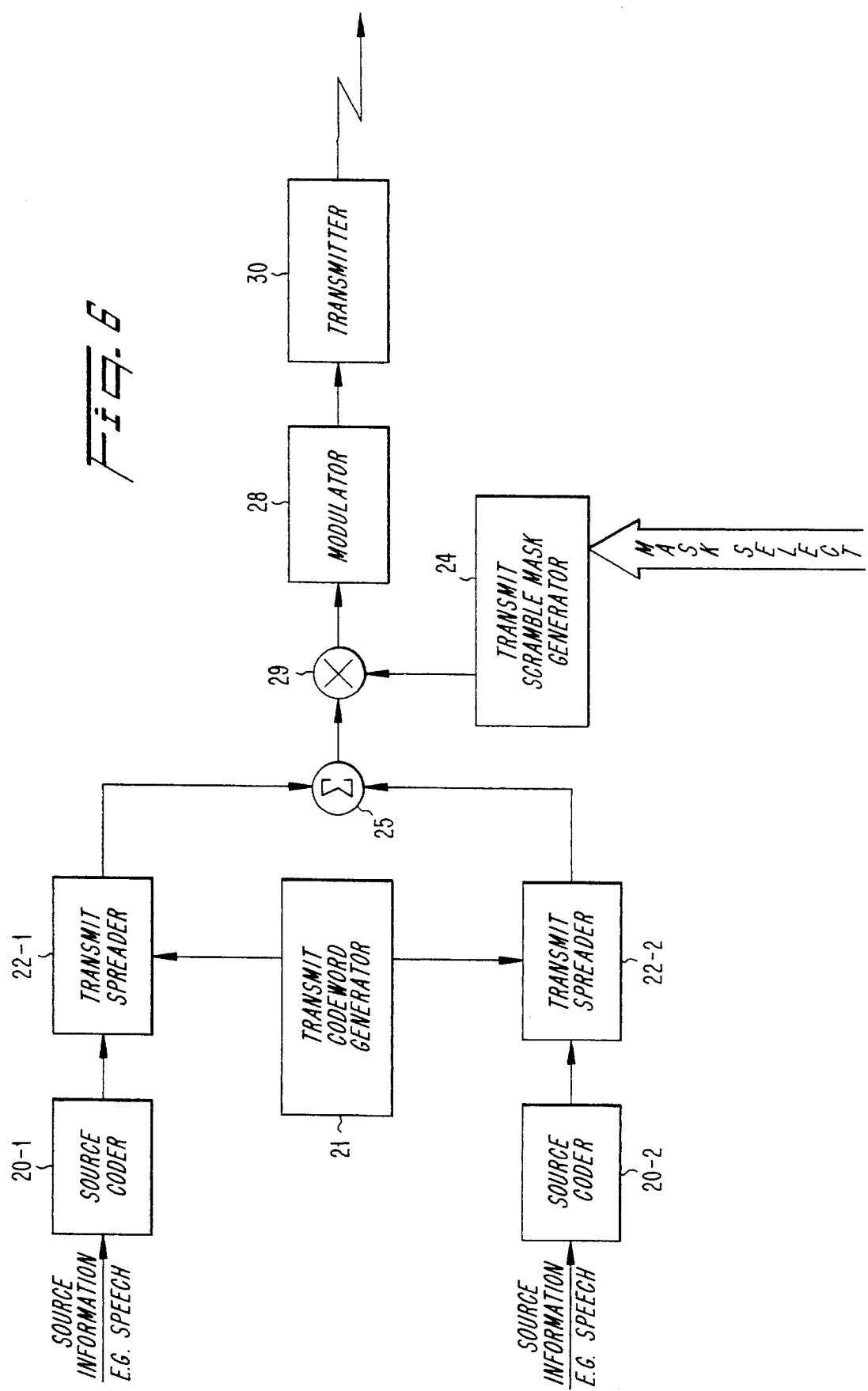

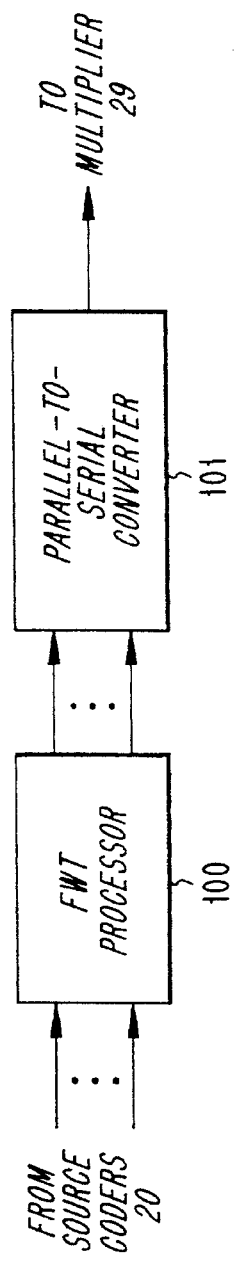
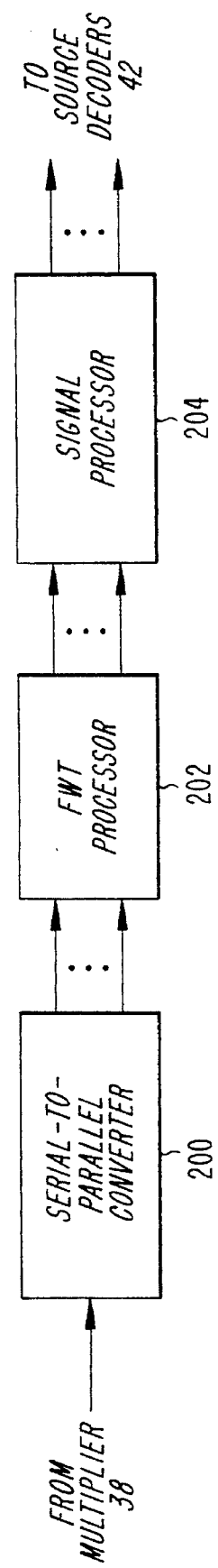

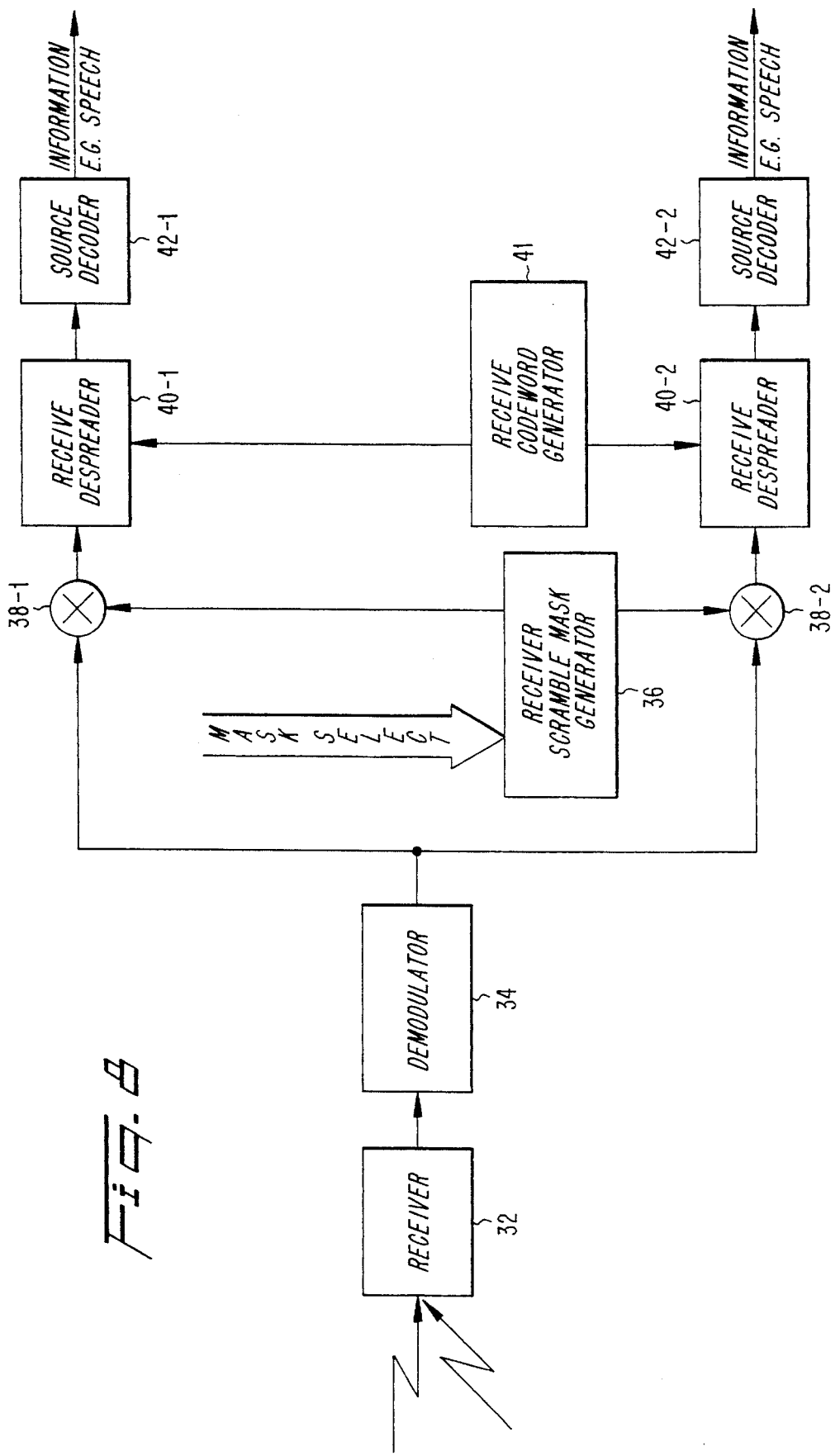

MULTIPLE ACCESS CODING USING BENT SEQUENCES FOR MOBILE RADIO COMMUNICATIONS

This application is a continuation in part of U.S. patent application Ser. No. 07/866,865, filed Apr. 10, 1992, now U.S. Pat. No. 5,353,352, which is expressly incorporated here by reference.

BACKGROUND

This application relates to spread-spectrum multiple access (SSMA), or code-division multiple access (CDMA), communication techniques in radio telephone systems. More particularly, this application relates to a CDMA communication system in which scramble masks are used in distinguishing and protecting information signals.

In a conventional code division multiplexing (CDM) or CDMA system, an information sequence to be communicated is spread, or mapped, into a longer sequence by combining the information sequence with a spreading sequence. As a result, one or more bits of the information sequence are represented by a sequence of N "chip" values.

For example, at a transmitter, a binary information symbol b (±1) can be spread by multiplying b with a spreading sequence x; for example, the spreading sequence x might be +1, −1, +1, −1, consisting of four binary chips. In essence, the spreading process replaces each binary information symbol with a four-chip spread symbol: +1, −1, +1, −1 when b=+1; and −1, +1, −1, +1 when b=−1. In this process called "direct spreading", each spread symbol is essentially the product of an information symbol and the spreading sequence.

In a second form of spreading called "indirect spreading", the different possible information symbols are replaced by different, not necessarily related, spreading sequences. Such mapping from information symbol to spread symbol can be viewed as a form of block coding. In the general case, a single M-ary information symbol, i.e., a symbol that can take on any of M possible values, is mapped to one of M possible spread symbols. In the binary case, the symbol b=+1 might be replaced by the sequence x=+1, −1, +1, −1, and the symbol b=−1 might be replaced by the sequence y=+1, +1, −1, −1.

In either direct or indirect spreading, the information symbol may be derived from a differential symbol d. For example, a binary information symbol b at a time n (denoted b(n)) may be determined by the information symbol at a time n−1 (denoted b(n−1)) and a differential information symbol d at the time n (denoted d(n)) according to the following relationship:

$$b(n)=b(n-1)\ d(n)$$

which gives:

$$d(n)=b(n)\ b^*(n-1)$$

where * denotes complex conjugate. Also, it will be understood that the information symbols described above may be produced by preceding stages of channel coding and/or spreading.

An advantage of such spreading is that information from many sources can be transmitted at the same time in the same frequency band, provided the spreading sequences used to represent the different sources' information sequences do not interfere with one another too much. In effect, the different spreading sequences correspond to different communication "channels".

In general, there are $2^N$ possible binary spreading sequences of length N chips, which results in a very large number of possible CDMA channels. This property of a CDMA system is sometimes called "soft capacity" because the number of channels is not restricted to N, as it would be in a frequency-division multiple access (FDMA) or a time-division multiple access (TDMA) system of the same bandwidth and data rate. Various aspects of conventional CDMA communications are described in K. Gilhousen et al., "On the Capacity of a Cellular CDMA System," *IEEE Trans. Veh. Technol.* vol. 40, pp. 303–312 (May 1991).

Obtaining this CDMA advantage, however, requires a performance tradeoff. To minimize interference among the channels due to their overlap in time and frequency, the spreading sequences (and thus the CDMA channels) must be mutually orthogonal, i.e., the cross-correlations of the spreading sequences must be zero. (Two binary sequences are orthogonal if they differ in exactly one-half of their bit positions.) On the other hand, there are only N orthogonal spreading sequences of length N. This severely limits the number of CDMA channels available, reducing or eliminating CDMA benefits such as soft capacity. Also, for high-capacity systems, the channels must be re-used in cells that are closer together, leading to higher interference.

As noted above, it may be recognized that spreading an information sequence by combining it with one of a set of orthogonal spreading sequences is similar to the common process of block coding. In many communication systems, the information sequence to be communicated is so coded for correcting errors. In orthogonal block coding, a number M of information bits are converted to one of $2^M$ $2^M$-bit orthogonal codewords. Decoding such an orthogonal codeword involves correlating it with all members of the set of $N=2^M$ codewords. The binary index of the codeword giving the highest correlation yields the desired information.

For example, if the correlations of a received 16-bit codeword with each of the set of sixteen orthogonal 16-bit codewords having indices 0–15 produce the highest correlation on the tenth codeword, the underlying information signal is the 4-bit binary codeword 1010 (which is the integer ten in decimal notation). Such a code is called a [16,4] orthogonal block code. By inverting all of the bits of the codewords, one further bit of information may be conveyed per codeword. This type of coding is known as bi-orthogonal block coding.

A significant feature of such coding is that simultaneous correlation with all the orthogonal block codewords in a set may be performed efficiently by means of a Fast Walsh Transform (FWT) device. In the case of a [128,7] block code, for example, 128 input signal samples are transformed into a 128-point Walsh spectrum in which each point in the spectrum represents the value of the correlation of the input signal samples with one of the codewords in the set. A suitable FWT processor is described in U.S. Pat. No. 5,356,454, which is incorporated here by reference.

As noted above, the typical CDMA system spreads an information sequence into block error correction codewords, and then combines the block codewords with a code sequence that is unique to each user. In the system described in Applicants' U.S. Pat. No. 5,353,352 the block codewords are combined with a scramble mask that does not further spread the information sequence.

SUMMARY

Applicants have found that it is not necessary for all users to employ all of a set of orthogonal error correction codewords. Instead, it is an object of Applicants' invention to improve the capacity of a CDMA system by assigning each user a small number of the codewords and using scramble masks that have selected properties.

It is another object of this invention to provide a cellular communication system having an extended number of channels available in each cell.

It is a further object of this invention to provide a cellular communication system in which interference between cells is reduced.

These and other objects and advantages are achieved in one aspect of Applicants' invention by a transmitter in a system for communicating a sequence of information symbols that includes means for spreading each information symbol with a respective spreading sequence to form a sequence of spread symbols. The spreading sequences are selected from a set of spreading sequences that are mutually orthogonal or bi-orthogonal.

The transmitter also includes means for scrambling each spread symbol with a common scramble mask to produce a sequence of scrambled symbols and means for transmitting the sequence of scrambled symbols over a communication channel. The common scramble mask is selected from a set of scramble masks having optimal or semi-optimal correlation properties.

In another aspect of Applicants' invention, the transmitter's spreading means may spread each information symbol of a plurality of sequences of information symbols with a respective spreading sequence to form a plurality of sequences of spread symbols. The scrambling means then scrambles each spread symbol in each sequence of spread symbols with a respective common scramble mask to produce a plurality of sequences of scrambled symbols. The transmitter then includes means for combining the plurality of sequences of scrambled symbols to form a sequence of combined scrambled symbols, which is transmitted over the communication channel.

The transmitter's spreading means and scrambling means can be combined into a means for spreading and scrambling each information symbol with a respective effective spreading sequence to form a sequence of scrambled spread symbols. The effective spreading sequences are selected from a set of effective spreading sequences, pairs of the effective spreading sequences either being mutually orthogonal or bi-orthogonal or having optimal or semi-optimal correlation properties. The scrambled spread symbols are transmitted over the communication channel.

The transmitter may also include means for converting the sequence of information symbols into a sequence of blocks of binary digits, and means for generating first pseudorandom numbers and a second pseudorandom number. Each first pseudorandom number is associated with a respective block of digits. The transmitter then has means for combining the first pseudorandom numbers with the respective blocks to generate a sequence of enciphered symbols, and means for offsetting the second pseudorandom number to form a scramble mask index. The spreading means spreads each enciphered symbol with a respective spreading sequence to form the sequence of spread symbols; the scrambling means scrambles each spread symbol with the common scramble mask to produce the sequence of scrambled symbols; and the scramble mask is selected based on the scramble mask index.

In accordance with another aspect of Applicants' invention, a receiver in a system for communicating sequences of information symbols includes means for receiving a composite signal including a plurality of spectrally overlapping sequences of spread, scrambled information symbols. The receiver also includes means for descrambling the composite signal with a scramble mask selected from a set of scramble masks having optimal or semi-optimal correlation properties.

The descrambling means produces a sequence of descrambled symbols that is despread by a despreading means using spreading sequences, and the despreading means includes means for correlating at least one shift of each descrambled symbol with at least one of the spreading sequences. The despreading means produces at least one correlation value for each descrambled symbol using the spreading sequences, which are mutually orthogonal or bi-orthogonal. A processor manipulates the correlation values to detect at least one sequence of information symbols.

In another aspect of Applicants' invention, the receiver's descrambling means produces a plurality of sequences of descrambled symbols, each sequence of descrambled symbols corresponding to a respective sequence of information symbols. The despreading means then produces at least one correlation value from each descrambled symbol by correlating at least one shift of each descrambled symbol with at least one respective spreading sequence. The processing means processes the correlation values to detect the plurality of sequences of information symbols.

The receiver's descrambling means and despreading means can be combined into means for descrambling and despreading the composite signal with an effective spreading sequence that is selected from a set of effective spreading sequences. Pairs of the effective spreading sequences either have optimal or semi-optimal correlation properties or are mutually orthogonal or bi-orthogonal.

The receiver may also include means for generating a scramble mask address and for selecting, based on the scramble mask address, a scramble mask from the set of scramble masks having optimal or semi-optimal correlation properties. Then, the descrambling means descrambles the composite signal with the selected scramble mask to produce the sequence of descrambled symbols, and the processing means processes the correlation values to detect at least one sequence of enciphered information symbols. Means for deciphering at least one detected sequence of enciphered information symbols using a pseudorandom number associated with the respective information symbols is also provided.

In other aspects of Applicants' invention, several methods of transmitting a sequence of information symbols and several methods of detecting information symbols are provided. For example, a transmitting method includes the steps of spreading each information symbol with a respective spreading sequence, scrambling each spread symbol with a common scramble mask, and transmitting the sequence of scrambled symbols over a communication channel. An exemplary detecting method includes the steps of receiving a composite signal that has a plurality of spectrally overlapping sequences of spread, scrambled information symbols; descrambling the composite signal with a scramble mask selected from a set of scramble masks having optimal or semi-optimal correlation properties; despreading the descrambled symbols using spreading sequences; and processing signals produced by the despreading step to detect at least one sequence of information symbols.

BRIEF DESCRIPTION OF THE DRAWINGS

The features and advantages of the Applicants' invention will be understood by reading the description in conjunction with the drawings, in which:

FIG. 1 is a generalized schematic showing a spread spectrum communications system in accordance with Applicants' invention;

FIG. 1A is a generalized schematic showing a spread spectrum communications system using effective spreading sequences in accordance with Applicants' invention;

FIG. 5 is a generalized block diagram of another embodiment of a transmitter for a spread spectrum communications system in accordance with Applicants' invention;

FIG. 6 is a block diagram illustrating an alternative embodiment of the transmitter illustrated in FIG. 5;

FIG. 7 is a block diagram of an alternative arrangement for the transmitter illustrated in FIG. 6;

FIG. 8 is a generalized block diagram of another embodiment of a receiver for a spread spectrum communications system in accordance with Applicants' invention;

FIG. 10 is a block diagram of an alternative arrangement for the receiver illustrated in FIG. 9.

DETAILED DESCRIPTION

Figure 2:
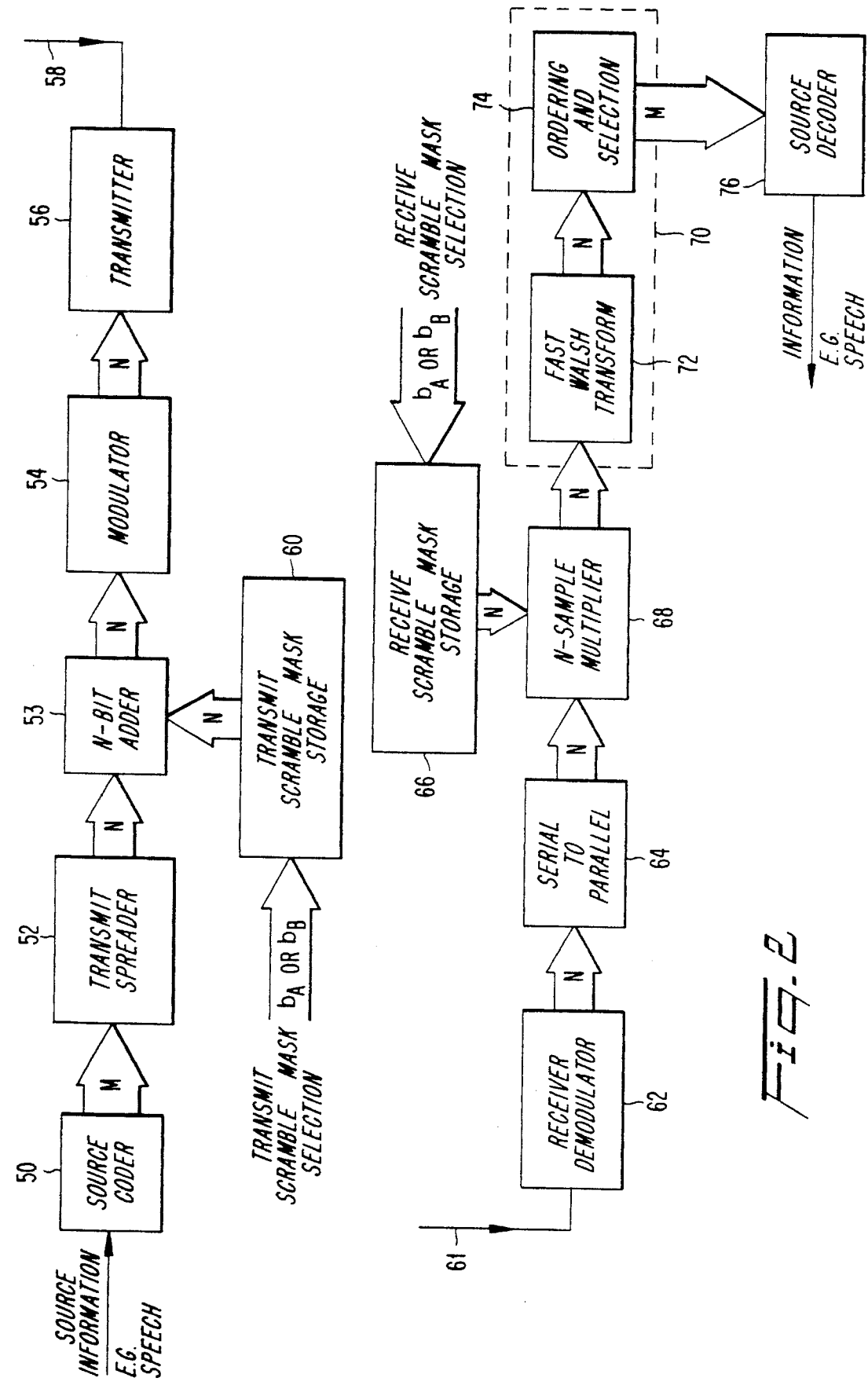
FIG. 2 is a functional block diagram of a system that may be used to implement one of the preferred embodiments of Applicants' invention.

Applicants' invention is useful for both direct and indirect spreading. In accordance with one aspect, each of an entire set of orthogonal or bi-onthogonal Walsh-Hadamard codewords is not used to encode, or spread, a plurality of information bits to be sent by each user. Instead, only a few of the set of codewords, or spreading sequences, are assigned to each user, and each symbol of that user's binary information sequence is replaced by one the selected codewords according to the value of the information symbol. For example, a codeword and its bi-orthogonal counterpart may be assigned to each user, and this will be recognized as a system that uses direct spreading.

In general, the information sequence consists of M-ary information symbols m that can each take on one of M possible values. For an M-ary information sequence, M codewords are selected from the set of codewords and assigned to each user. For a binary information sequence, two of a set of binary codewords are assigned to each user, and each bit of that user's information sequence is replaced by one or the other of the selected codewords according to the value of the information bit.

For each user, the assigned codewords are then combined with a scramble mask assigned to several users to form the signature sequences that are transmitted. For binary sequences, the combinations are formed by modulo-2 addition. The assigned scramble mask, which has the same length as the assigned codewords, is selected from a set of scramble masks having optimal or semi-optimal properties as described below. In accordance with Applicants' invention, the set of scramble masks is designed as described in Applicants' U.S. Pat. No. 5,353,352 to regulate the cross-correlation of any orthogonal codeword masked by a first scramble mask with any orthogonal codeword masked by any other scramble mask.

In practice, the codeword and the scramble mask can be precombined to form an effective spreading or signature sequence. Thus, at the transmitter, separate spreading and scrambling operations may be combined into a single spreading operation using the effective spreading sequences. Similarly, at the receiver, separate descrambling and despreading operations may be combined into a single despreading operation.

Since the length of the scramble mask is the same as the length of the codeword, it will be understood that converting the information symbol to the codeword does all the spreading when separate spreading and scrambling operations are used. If the spreading and scrambling operations are combined by use of an effective spreading sequence (i.e., a scrambled codeword), then the spreading is done by the effective spreading sequence.

A suitable set of scramble masks can be generated as described in Applicants' U.S. Pat. No. 5,353,352. Several sets of effective spreading sequences can be generated from an original set of N spreading sequences, or codewords, which may be orthogonal or bi-orthogonal, by scrambling each sequence in the original set with each of such a set of scramble masks. Thus, each scramble mask generates an additional set of N new effective spreading sequences. Since each user would be assigned at least two effective spreading sequences (for binary information symbols), these additional sets can be used for expanding the number of channels in a cell, i.e., increasing capacity, and different cells can use different ones of the additional sets, controlling intercell interference.

The scramble masks preferably are members of an "ideal" set of scramble masks having "optimal" properties as described in Applicants' U.S. Pat. No. 5,353,352. A set of binary scramble masks is an ideal set when the modulo-2 sum of any two masks in the set is a "bent" sequence.

Applicants' system employing such scramble masks avoids the disadvantages of a conventional orthogonal CDMA system. First, it can recover lost "soft capacity", viz., increase the number of channels in a cell from N spreading sequences to kN spreading sequences, by scrambling the original N orthogonal spreading sequences with each of k different scramble masks. Second, Applicants' system can minimize interference between cells by having nearby base stations use different scramble masks for generating spreading sequences used in the cells. These scramble masks can be re-used by other base stations separated by suitable distances, in a manner similar to frequency reuse in FDMA cellular systems. In this way, Applicants' CDMA system may use code planning instead of frequency planning. It will be understood that in this description the term "cell" means an area illuminated by one or more antennas.

As described in Applicants' U.S. Pat. No. 5,353,352, ideal scramble masks having optimal correlation properties are only possible when the sequence length N is an even power of two and when the square root of N is an integer. Such scramble masks result in interfering signals that have a flat Walsh spectrum. Applicants' U.S. Pat. No. 5,353,352 describes a Method A for producing a set of $N^{1/2}$ ideal scramble masks, and a Method B for producing a set of N/2 ideal scramble masks.

When N is an odd power of two, it is not possible to construct the scramble masks such that the sum of any two is a bent sequence, equally correlated in magnitude to all N Walsh-Hadamard codewords. Nevertheless, one can construct sets of "semi-ideal" scramble masks such that the sum of any two is a "half-bent" sequence, which is a sequence that is equally correlated in magnitude to half of the N codewords and has zero correlation with the other half.

In a first way of constructing semi-ideal sets of scramble masks, either Method A or Method B is used to produce a set of either $(N')^{1/2}$ or $N'/2$ scramble masks, respectively, of length N', where N'=2N and N is an odd power of two. Then, the last half of each scramble mask is dropped, leaving masks of length N'/2=N. Thus, depending on which Method is used, a set of either $(2N)^{1/2}$ or N scramble masks of length N is formed such that the sum of any two scramble masks is half-bent.

In a second way of constructing semi-ideal sets of scramble masks, either Method A or Method B above is again used to generate a set of either $(N')^{1/2}$ or $N'/2$ scramble masks, respectively, of length N', where N'=N/2 and N is an odd power of two. Then, for each N'-length sequence, a copy of itself is appended, giving masks of length 2N'=N. Alternatively, it is also possible to append a copy of a different mask to each mask instead of appending to each a copy of itself. Thus, depending on which Method is used, a set of either $(N/2)^{1/2}$ or $N/4$ scramble masks of length N is formed such that the sum of any two scramble masks is half-bent.

Also, ideal and semi-ideal scramble mask sets can be augmented through the use of special masks as described in Applicants' U.S. Pat. No. 5,357,454.

When a scramble mask set is semi-ideal or has been augmented, the set's correlation properties can be called "semi-optimal". When assigning scramble masks to different cells, care should be taken that scramble masks having optimal properties are used in cells close together to avoid excessive interference; scramble masks having semi-optimal properties can be used in cells separated by greater distances.

In transmitting the spread symbols, pulse shaping is advantageously applied to the chip values. Nyquist pulse shapes, such as root-raised-cosine shapes, are commonly desired. One method is to pass the chip values as impulses to a filter having an impulse response that is the desired pulse shape. Such a filter can be implemented as either an analog or a digital filter. Another method is to use the chip values as addresses into look-up tables for retrieving oversampled waveforms that are passed to a digital-to-analog converter.

The pulse-shaped spread symbols then modulate a carrier signal and are transmitted. To transmit simultaneously on the same carrier the spread symbols from a plurality of information channels, the spread symbols can be combined after spreading, after pulse shaping, or after modulation. Combining may even occur during spreading because spreading can be achieved by passing the plurality of information symbols through a Fast Walsh Transform device, such as that disclosed in U.S. patent application Ser. No. 07/735,805.

To provide a more uniform distribution of signal energy, it may be desirable to use both in-phase (I) and quadrature (Q) components, as is done in the CDMA standard designated IS-95 by the TIA. Alternatively, an entire signal may be placed on either an I-carrier or a Q-carrier.

At the receiver, the received modulated carrier signal is usually filtered and mixed with a local oscillator signal having the carrier's frequency, producing a demodulated signal at baseband that is then sampled. One example of this process uses log-polar processing, as described in U.S. Pat. No. 5,048,059 to Dent, which is incorporated herein by reference.

The samples of the demodulated signal are then correlated to the conjugate(s) of the spreading sequence(s), according to the spreading form used and the number of channels to be detected. This process, called descrambling and despreading the demodulated signal, can be realized by correlating directly to the assigned effective spreading sequence, which as described above is the combination of a scramble mask and an orthogonal or bi-orthogonal spreading sequence, or codeword. Alternatively, the descrambling and despreading can be performed separately: (1) descrambling by correlating to the appropriate scramble mask(s), and (2) despreading by correlating to the appropriate orthogonal or bi-orthogonal spreading sequence(s).

After descrambling and despreading, several detection schemes are possible for detecting the spread information symbols. During each spread information symbol period, a correlation value is produced for each ray, or echo, of the transmitted signal for each spreading sequence. Depending on the system parameters, the received signal may include either only one ray or a plurality of rays. RAKE techniques for handling plural rays are described in U.S. Pat. No. 5,237,586 to Bottomley, which is incorporated here by reference.

For the coherent-detection case, the correlation values associated with different rays of the same information sequence can be coherently RAKE combined by multiplying each correlation value by the conjugate of the associated channel tap estimate and then summing the real parts of the products (see J. G. Proakis, *Digital Communications*, 2nd ed., New York: McGraw-Hill, 1989). Each combined value is then used to determine which spread symbol was sent. In the incoherent-detection case, the correlation values associated with different rays of the same information sequence can be incoherently RAKE combined by forming the magnitude squared and then summing the results. The combined values, one for each information sequence, are then compared to determine the largest. It will be appreciated that both the coherent-detection and incoherent-detection cases can employ variations of the combining processes, depending on whether the rays are combined using maximal-ratio-combining, equal-gain-combining, or selective combining.

The detected spread symbols are used to determine the information symbol. It will be appreciated that a system in accordance with Applicants' invention can use a variety of joint-demodulation techniques, such as maximum likelihood sequence estimation (MLSE) joint detection, decorrelation, and pseudo-MLSE, as described in U.S. patent application Ser. No. 08/155,557 filed Nov. 22, 1993. The system can also use subtractive demodulation, as described in U.S. Pat. No. 5,151,919 to Dent. Both U.S. patent application Ser. No. 08/155,557 now U.S. Pat. No. 5,506,861 and U.S. Pat. No. 5,151,919 are incorporated here by reference.

A general CDMA system in accordance with Applicants' invention will now be described in conjunction with FIG. 1. An information source such as speech is convened from analog format to digital format in a conventional source coder 20. A transmit codeword generator 21 produces a set of one or more orthogonal or bi-orthogonal codewords, and a transmit spreader 22 uses those codewords to spread the digital bitstream generated by the transmitter source coder 20. The transmit spreader 22 spreads each information symbol with one respective codeword, producing an orthogonal spreading sequence, or codeword, corresponding to the value of each information symbol.

In response to a scramble mask selection signal from a suitable control mechanism such as a programmable microprocessor (not shown), a particular scramble mask is generated by a transmit scramble mask generator 24. The selected scramble mask is summed in a modulo-2 adder 26 with the codewords from the transmit spreader 22. It will be appreciated that the modulo-2 addition of two binary sequences is essentially an exclusive-OR operation in binary logic, and the modulo-2 summation effectively scrambles each codeword. The scrambled codewords produced by the adder 26 modulate a radio frequency (RF) carrier using any one of a number of modulation techniques, such as binary phase shift keying (BPSK), carried out by a modulator 28.

The modulated carrier is transmitted over an interface, e.g., air, by way of a suitable conventional radio transmitter 30. A plurality of the coded signals overlapping in the allocated frequency band are received together in the form of a composite signal waveform at a radio receiver 32, such as a cellular base station. After demodulation in a demodulator 34 to baseband, the composite signal is decoded.

An individual information signal is descrambled by multiplying the composite signal with the corresponding unique scramble mask produced by a receiver scramble mask generator 36. This unique mask corresponds to that scramble mask used originally to scramble that information signal in the transmit scramble mask generator 24. The scramble mask and the demodulated composite signal are combined by a multiplier 38. The resulting descrambled signal is provided to a receive despreader 40, which correlates it to one or more of the orthogonal codewords, or spreading sequences, provided by a receive codeword generator 41. In particular, the multiplier 38 and the receive despreader 40 preferably despread at least one shift of the demodulator output signal. If desired, the despreader 40 may also provide for RAKE combining of several correlations, corresponding to descrambling and despreading several shifts of the demodulator output signal. In any event, the despread, or detected, signal produced is converted into analog format (e.g., speech) by a source decoder 42.

As noted above, the codewords provided by the transmit spreader 22 and the scramble mask provided by the generator 24 can be precombined to form effective spreading sequences, or scrambled codewords. FIG. 1A shows the general CDMA system illustrated in FIG. 1 modified appropriately for using effective spreading sequences. At the transmitter, the separate spreading and scrambling operations are combined into a single spreading operation performed by the transmit spreader 22 using effective spreading sequences provided by a transmit scrambled codeword generator 23, which replaces the transmit codeword generator 21, the transmit scramble mask generator 24, and the adder 26. Similarly, at the receiver, the separate descrambling and despreading operations are combined into a single despreading operation performed by the receive despreader 40 using corresponding effective spreading sequences provided by a receive scrambled codeword generator 43, which replaces the receive codeword generator 41, the multiplier 38, and the receiver scramble mask generator 36. In other respects, the system illustrated in FIG. 1A operates just as the system illustrated in FIG. 1.

The important differences between the systems of FIGS. 1 and 1A are in the sequences used by the transmit spreader 22 and the receive despreader 40. The system shown in FIG. 1 uses orthogonal sequences, and the system shown in FIG. 1A uses scrambled orthogonal sequences. In effect, the transmit spreaders 22 are simply selectors that choose the appropriate codeword or scrambled codeword according to the values of their respective input signals. For the system shown in FIG. 1A, it will be understood as described in this application that any two effective spreading sequences either are mutually orthogonal or have good correlation properties. Because the codewords are mutually orthogonal, two effective spreading sequences are mutually orthogonal if they were produced from the same scramble mask, and they have "good" (i.e., optimal or semi-optimal) correlation properties if they were produced from different scramble masks.

Applicants' invention may be readily incorporated into a multiple access spread spectrum communications system by storing the scramble masks in a look-up table in a RAM or ROM memory, for example, from which a particular mask is retrieved by supplying its associated address. A system for implementing the scramble masks into a spread spectrum system is illustrated in FIG. 2, which generally corresponds to FIG. 1. While described in terms of a memory look-up table, it will be appreciated that a suitable scramble mask generator, such as a digital logic circuit or microcomputer, that produces on-line the scramble masks indicated by mask selection control input signals may also be used. Memory look-up and on-line production techniques can also be applied to the orthogonal or bi-orthogonal spreading sequences as well as the effective spreading sequences.

Source information, e.g., speech, is converted to blocks of M binary bits in a source coder 50, and each bit in these blocks is converted into one or the other of a pair of N-bit orthogonal codewords by transmit spreader 52, according to the value of each bit. Each orthogonal codeword is scrambled by a modulo-2 N-bit adder 53 with a scramble mask that is constructed as described above and that is provided by a means 60 for generating scramble masks. In the case of ideal scramble masks, the set of scramble masks includes either $n_A=N^{1/2}$ or $n_B=N/2$ scramble masks, depending on which method was used to generate the scramble mask set.

Since only one scramble mask from the set is needed, the generating means 60 may be a register or other storage device capable of storing the N bits of the scramble mask assigned. On the other hand, the whole set may be stored as a look-up table in a memory, in which case the number of bits needed to address each mask from the memory 60 is either $b_A=\log_2(n_A)$ or $b_B=\log_2(n_B)$. By transmitting the $b_A$-bit or $b_B$-bit scramble mask selection address associated with a particular scramble mask to the memory 60, that mask would be retrieved from storage and modulo-2 added to the block coded signal.

The ability selectively to address and retrieve a specific scramble mask becomes important in a subtractive CDMA system. For example, if stronger coded information signals are decoded first and removed from the composite signal before weaker signals are decoded, the scramble masks must be ordered by the signal strength of their associated, coded information signals. In CDMA subtractive demodulation according to U.S. Pat. No. 5,151,919 incorporated by reference above, the scramble mask corresponding to the strongest information signal would be selected for decoding. After that signal is removed, the scramble mask corresponding to the next-strongest information signal would be selected and that signal removed, and so forth until the weakest signal were decoded.

The masked codewords from the N-bit adder 53 are applied to a parallel-to-serial converter and modulator 54 which impresses them onto a radio-frequency carrier. The modulated carrier signal is amplified and transmitted via a transmitter 56 and antenna 58.

At the receiver, the composite signal received by an antenna 61 is provided to a receiver demodulator 62 that demodulates, samples, and digitizes the composite signal. A serial-to-parallel converter 64 converts the serial samples into parallel blocks of signal samples (which may be complex, corresponding to in-phase and quadrature signal components). The order in which each information signal is decoded in the receiver is determined by the receive scramble mask selection address $b_A$ or $b_B$ applied to a scramble mask memory 66.

In a specialized N-sample multiplier 68, each of the N parallel samples buffered in the serial-to-parallel converter 64 is multiplied by +1 or −1, depending on the scramble mask retrieved from the memory 66. One way to perform this multiplication is to exclusive-OR each bit of the digital sample with the corresponding scramble mask bit. For example, if the first of the N digital samples is 1011 and the first scramble mask bit corresponds to −1, then the first of the N output samples would be 0100. If the received samples are complex, different scramble masks could be used for the in-phase and quadrature components.

The descrambled signals are despread in a receive despreader 70, which may include an FWT circuit 72. With direct spreading, the FWT would despread, in parallel, all signals having a common scramble mask; then, detection would be performed, possibly by using channel estimation. With indirect spreading, the magnitude-squared values corresponding to the M possible sequences of a particular user would be compared in an ordering and selection unit 74; the largest value would indicate the detected sequence. The FWT circuit 72 would preferably operate on complex numbers when the demodulator 62 and converter 64 deliver complex signal samples, which is often the case when the phase of the received signal is not known. The decoded, or detected, spread bits of information are received by a source decoder 76 for conversion into analog form, e.g., speech.

Figure 3:
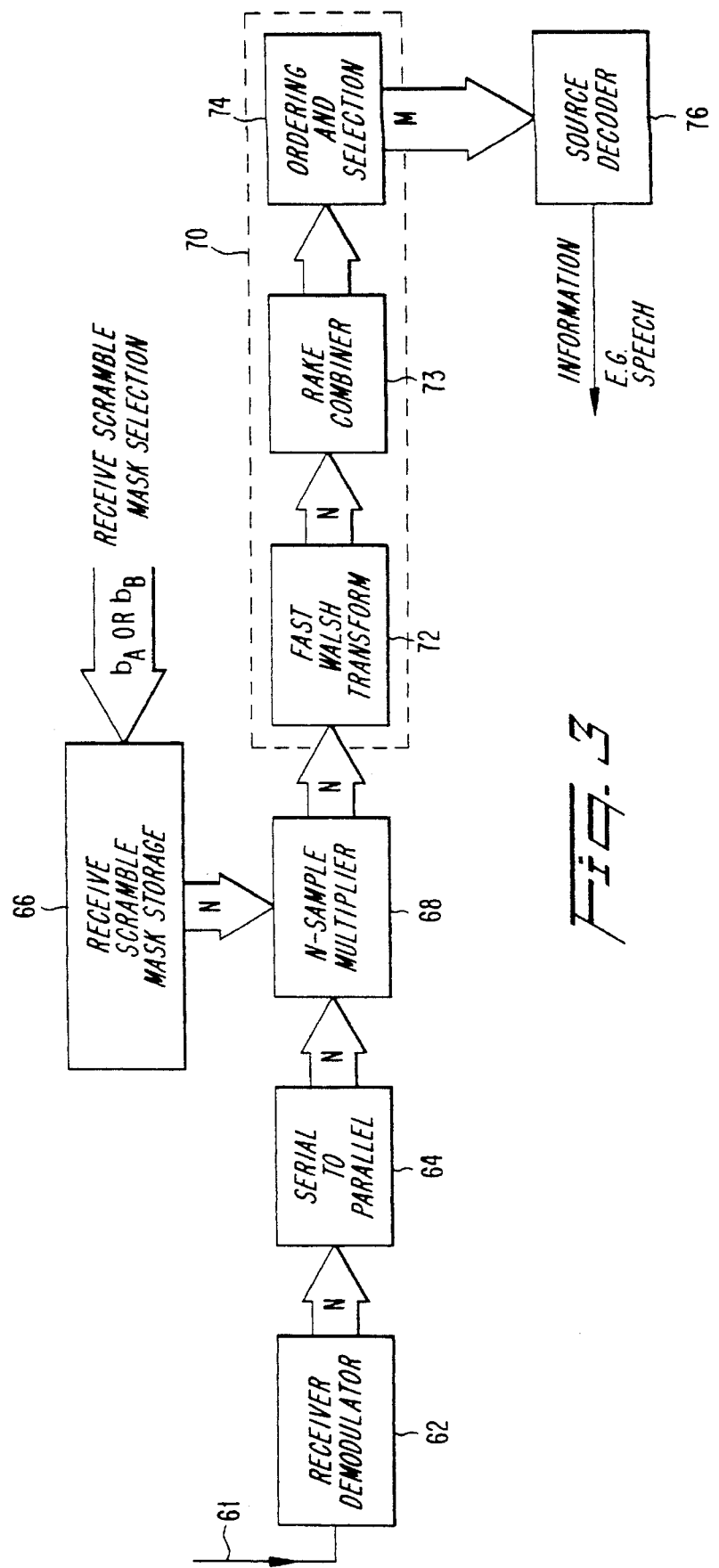
FIG. 3 is a block diagram of another receiver in accordance with Applicants' invention.

In multiple access spread spectrum communications, it is not uncommon for the receiver to use the method of RAKE combining to combine correlations from different signal rays (i.e., to collect energy from a signal and its echoes). For the system shown in FIG. 2, this would appear as a RAKE combining element 73 between the FWT circuit 72 and the ordering and selection circuit 74 as illustrated in FIG. 3. For each of the N outputs of the FWT circuit, results from different signal times-of-arrival would be weighted and accumulated, before being sent to the ordering and selection circuit. Data corresponding to the different times-of-arrival would be provided by the serial-to-parallel converter 64. Furthermore, a new method, referred to as WRAKE combining, could be used in place of conventional RAKE combining. The RAKE combining technique and the new efficient WRAKE approach are detailed in U.S. Pat. No. 5,237,586 to Bottomley, which is expressly incorporated here by reference.

In CDMA systems, it is common to have different spreading stages. Thus, the foregoing description will be understood not to preclude previous or further spreading of the signal prior to transmission. Also, it does not preclude the use of additional scrambling by other sequences, which may be many times longer than N, the length of the spreading sequences. For example, complex transmitted signals are possible by further scrambling of each signal such that certain chips are sent on the in-phase (I) channel and certain chips are sent on the quadrature (Q) channel.

Other scenarios for generating complex signals are also possible. For one example, the scrambled, spread signal may be transmitted on either the I or Q channels. In a second example, a spreading sequence of length 2N could be used, where the even chips come from a spreading sequence of length N and are sent on the I channel and the odd chips come from a possibly different spreading sequence of length N and are sent on the Q channel. In this case, there would be two scramble masks, which possibly would be the same, applied to the even and odd chips separately.

Also, the scramble masks can be used with various sets of orthogonal sequences to produce useful effective spreading sequences. In the example described above, the set of orthogonal sequences is the Walsh-Hadamard set, and the scramble masks described in Applicants' U.S. Pat. No. 5,353,352 are employed directly. The described scramble masks can also be used directly with a set of orthogonal sequences formed by scrambling each codeword of the Walsh-Hadamard set with a common base sequence.

As yet another example, a set of orthogonal sequences can be formed from the Walsh-Hadamard set by permuting, or re-ordering, each Walsh-Hadamard codeword; for such an orthogonal set, a new set of scramble masks, formed by permuting the described scramble masks in the same way, would be used. Also, if the set of orthogonal sequences has been formed from an orthogonal set by scrambling with a common base sequence and permuting, then the described scramble masks can be used after permuting.

As discussed in Applicants' U.S. Pat. No. 5,353,352, the members of the set of scramble masks can themselves be scrambled by a common base sequence, thereby forming another set of scramble masks.

In a typical cellular communication system based on the preceding description, a "chip" would be a ± 1 value occurring in a particular time slot, but as described above, the chip values can be M-ary in general. Also, it will be appreciated that the chips can be associated with particular frequency bins instead of particular time bins, or slots. Such a system would employ "frequency spreading multiple access" as described in O.-C. Yue, "Spread spectrum mobile radio, 1977–1982," *IEEE Trans. Veh. Technol.*, vol. VT-32, pp. 98–105 (Feb. 1983). Furthermore, it will be appreciated that a "chip" can itself be a code sequence; for example, a +1 "chip" value might be the sequence +1, −1 and a −1 "chip" value could be the sequence −1, +1. It will be understood by those of skill in the art that these possibilities can be readily combined, yielding hybrid "chip" definitions.

An orthogonal CDMA system employing the optimal or semioptimal scramble masks described above can also provide the system security and individual privacy features described in Applicants' U.S. Pat. No. 353,352 by applying the methods described in that application.

Figure 4:
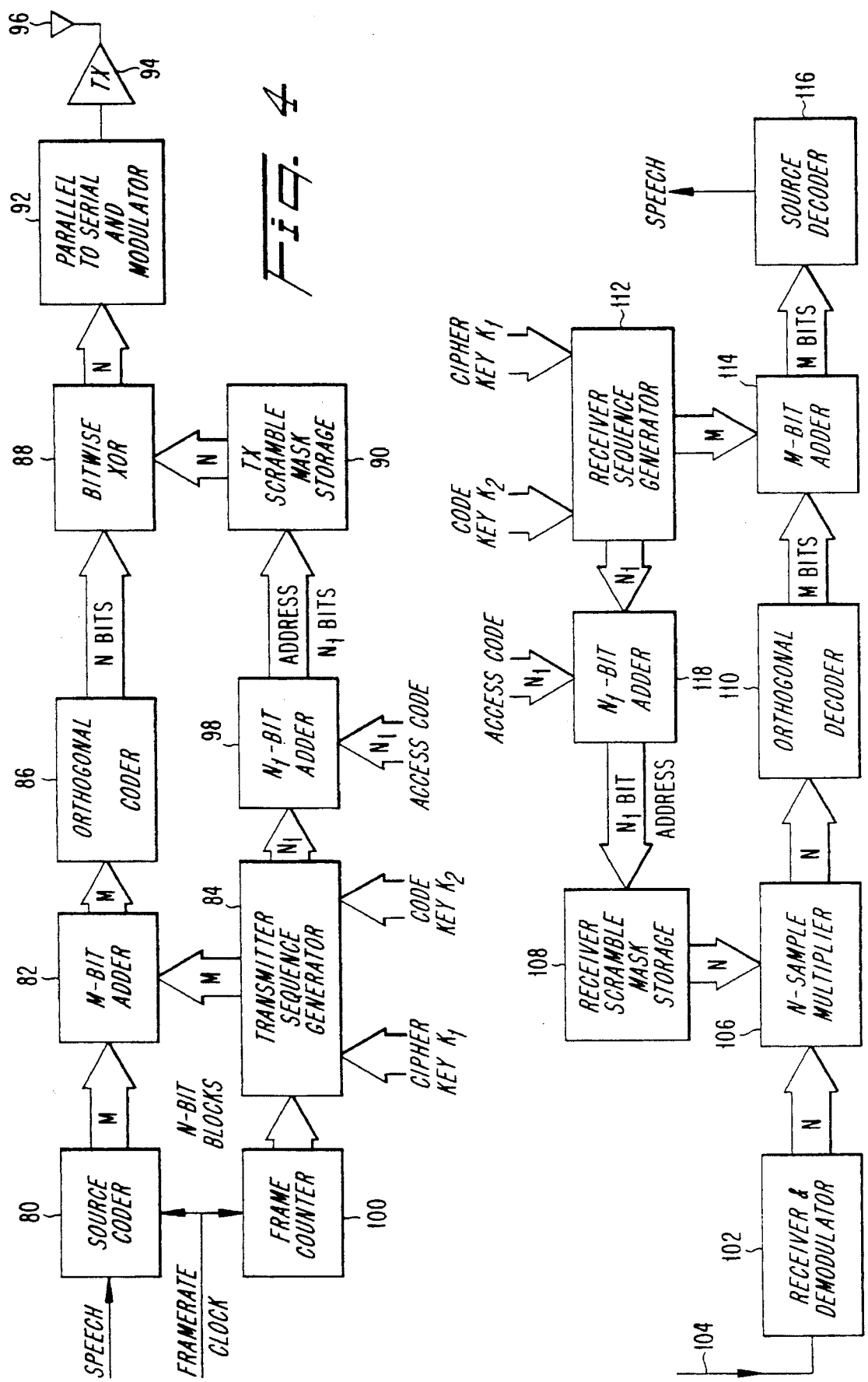
FIG. 4 is a functional block diagram of a system that may be used to implement another of the preferred embodiments of Applicants' invention.

Referring to FIG. 4, a source coder 80 converts speech information into digital form. Although not an essential aspect of this invention, the source coder 80 may also include conventional error correction coding capabilities. Before spreading, or coding, with an orthogonal sequence, M-bit blocks of the information bits are individually enciphered by modulo adding, in an M-bit adder 82, a unique enciphering bit sequence produced by a transmitter sequence generator 84 as a function of a cipher key K1 and a code key K2. Each bit of the enciphered information signals is then converted into one of preferably orthogonal or hi-orthogonal codewords in an orthogonal coder 86.

The codewords produced by the coder 86 are combined with a selected transmit scramble mask by a bitwise exclusive-OR circuit 88. The scramble mask is retrieved from a transmitter scramble mask memory 90. The scrambled codeword is then converted to a serial bitstream that modulates a radio carrier as represented in function block 92. The modulated carrier signal is amplified by a suitable amplifier 94 and transmitted by an antenna 96.

The receiver portion of FIG. 4 has hardware analogous to the transmitter portion. A receiver/demodulator 102 receives a composite signal from an antenna 104, demodulates it to baseband, and converts the serial signal into parallel signal samples or blocks of N bits. As described above, the signal samples may be complex, resulting from in-phase and quadrature components. These signal blocks are combined in a specialized N-sample multiplier 106 with an appropriately selected scramble mask retrieved from a receiver scramble mask storage device 108.

The descrambled signal produced by the multiplier 106 is despread by an orthogonal decoder 110 that uses, for example, the subtractive demodulation procedure described above. The despread, or detected, signal is deciphered by combining the appropriate cipher key K1 generated by a receiver sequence generator 112 with the despread signal in an M-bit adder 114. Error correction codes are removed from the descrambled digital information in a source decoder 116, and the result is converted into speech.

In FIG. 4, the RAKE combining element that was described above in connection with FIG. 3 would be part of the orthogonal block decoder 110. Data corresponding to the different times-of-arrival would be provided by the receiver/demodulator 102.

It will be appreciated by those of ordinary skill in this art that Applicants' invention can be applied to the transmission of a plurality of information signals. Greater efficiency can be achieved by duplicating only part of transmission chain for each signal, rather than by duplicating the entire transmission chain for each signal. Referring to FIG. 1, multiple signals can be combined at any one of at least three places: between the modulator 28 and the transmitter 30; between the modulo-two adder 26 and the modulator 28; and between the transmit spreader 22 and the modulo-two adder 26. The latter two cases are described in more detail below using simple examples of two information signals, but it will be understood that these examples are readily expanded to many more than two information signals.

FIG. 5 is a generalized block diagram of a transmitter for a spread spectrum communications system in accordance with Applicants' invention. Similar elements in FIGS. 1 and 5 have similar reference numerals. First and second source information signals such as speech are converted into digital bitstreams by respective source coders 20-1, 20-2. The information symbols in the digital bitstreams are spread by respective transmit spreaders 22-1, 22-2 using codewords provided by the transmit codeword generator 21. Different codewords are used for the different source information signals.

Also, the transmit scramble mask generator 24 provides either the same or different scramble masks for the different source information signals, and the respective scramble masks are summed with the codewords, or spread symbols, from the respective transmit spreaders by respective modulo-two adders 26-1, 26-2. The sequences of scrambled codewords produced by the adders 26-1, 26-2 are combined by a summer 27, and the sequence of combined scrambled symbols produced by the summer 27 is provided to the modulator 28. Because the scrambled codewords are combined before modulation, the summer 27 may be a digital logic circuit or a digital signal processor. Also, because both source information signals are spread and scrambled before combining, the spreading and scrambling operations may be combined as illustrated in FIG. 1A.

If the same scramble mask is used for both source information signals, then it is more efficient to combine the sequences of codewords produced by the transmit spreaders 22-1, 22-2 and then to scramble the combined sequence. Such a transmitter is illustrated in FIG. 6, which shows a summer 25 instead of the summer 27. Elements in FIGS. 1 and 6 that are similar have similar reference numerals.

In FIG. 6, the transmit codeword generator 21 again provides different codewords for the two digital sequences of spread symbols produced by the transmit spreaders 22-1, 22-2. The spread information symbols generated by the transmit spreaders are combined by the summer 25, which may be a suitable digital logic circuit or processor because the signals are combined before modulation. On the other hand, since the sequence of combined spread symbols produced by the summer 25 is no longer binary, scrambling is no longer accomplished by modulo-two addition. As shown in FIG. 6, a multiplier 29 scrambles the combined spread symbols by forming the product of the combined spread symbols and either −1 or +1 scramble mask values. In practice, this multiplication can be carded out simply by either negating or not negating the combined spread symbol values, a technique that can also be applied in the descrambling operations of any of the receiver embodiments described in this application.

It may be appreciated that the transmitter illustrated in FIG. 6 can be used for sending source information binary symbols by sending a codeword and the codeword's inverse, as appropriate. In this case, the transmit codeword generator 21, the transmit spreaders 22-1, 22-2, and the summer 25 can be replaced by the arrangement illustrated in FIG. 7. An FWT processor 100 performs a Fast Walsh Transform on the bits from the source coders 20-1, 20-2, and generates a parallel datastream that is converted to a serial datastream by a parallel-to-serial converter 101. The serial datastream is equivalent to the sequence of combined spread symbols produced by the summer 25 shown in FIG. 6, and is provided to the multiplier 29 in FIG. 6. The product of the serial datastream and the transmit scramble mask produced by the multiplier 29 is the sequence of scrambled combined spread symbols that is eventually transmitted.

It will be understood by those of ordinary skill in this art that Applicants' invention can be applied to the reception of a plurality of information signals. Referring to FIG. 1, multiple signals can be separated at any one of at least three places: between the receiver 32 and the demodulator 34; between the demodulator 34 and the multiplier 38; and between the multiplier 38 and the receive despreader 40. The latter two cases are described in more detail below using simple examples of two information signals, but it will be understood that these examples are readily expanded to many more than two information signals.

FIG. 8 is a generalized block diagram of a receiver for a spread spectrum communications system that separates a received composite signal before the multiplier 38 in accordance with Applicants' invention. Similar elements in FIGS. 1 and 8 have similar reference numerals. The receive scramble mask generator 36 provides either the same or different scramble masks appropriate for the different sequences of source information symbols to be recovered to multipliers 38-1, 38-2. The receive codeword generator 41 provides different codewords appropriate for the different source information symbols to respective receive despreaders 40-1, 40-2. The descrambled, despread signals produced by the despreaders (i.e., the detected signals produced from at least one correlation value for each descrambled, despread symbol) are provided to respective source decoders 42-1, 42-2. Although in FIG. 8 both source information signals are separately descrambled and despread, these operations can be combined as illustrated in FIG. 1A.

Figure 9:
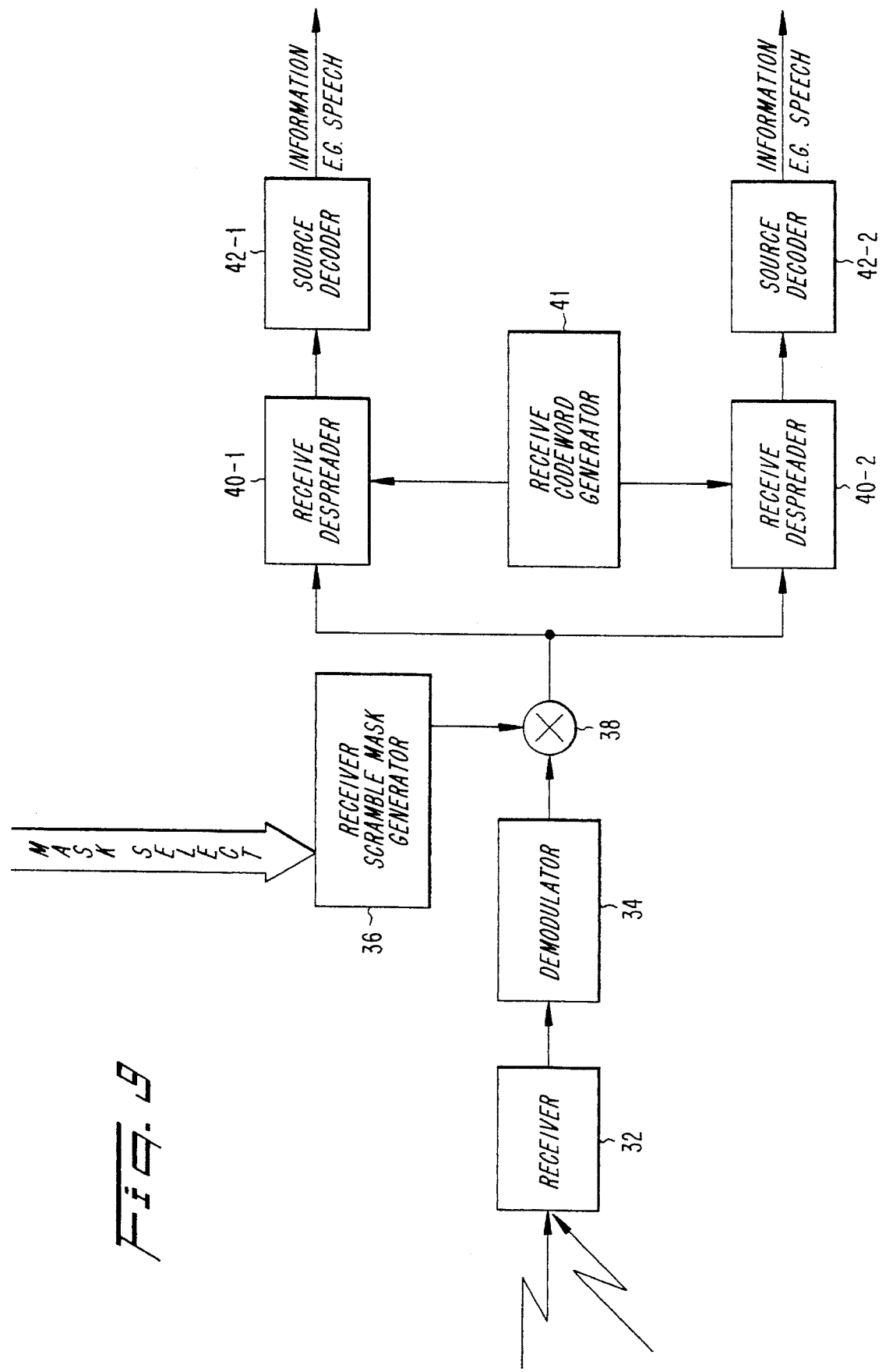
FIG. 9 is a block diagram illustrating an alternative embodiment of the receiver illustrated in FIG. 5.

If the same scramble mask is used by both source information signals, then it is more efficient to separate the signals after the multiplier 38. Such a receiver is illustrated in FIG. 9, in which elements similar to those in FIG. 1 have similar reference numerals. In FIG. 9, the receive codeword generator 41 again provides different codewords appropriate to the different sequences of source information symbols to be recovered. Because the codewords are orthogonal, the separate despreaders 40-1, 40-2 and the receive codeword generator 41 can also be combined.

It may be appreciated that the receiver illustrated in FIG. 9 can be used for recovering source information binary symbols by detecting a codeword and the codeword's inverse, as appropriate. In such an embodiment, the receive codeword generator 41 and the receive despreaders 40-1, 40-2 can be replaced by the arrangement illustrated in FIG. 10. The descrambled signal produced by the multiplier 38 is converted to a parallel datastream by a serial-to-parallel converter 200. An FWT processor 202 then performs a Fast Walsh Transform on the parallel values, which may be binary-valued or more generally M-ary-valued, and the transformed values are passed to a signal processor 204. The signal processor 204 may carry out further operations on the transformed values, depending on the application; for example, results from several received data shifts may be RAKE combined. The detected signals resulting from such processing (e.g., at least one correlation value for each descrambled, despread symbol) are provided by the processor 204 to the source decoders 42-1, 42-2.

FIGS. 8 and 9 illustrate embodiments of Applicants' invention using separate detection of the source information signals. In an embodiment in which a form of joint signal detection is used, the separate receive despreaders 40-1, 40-2 may be combined in one joint despreader. For example, the signal processor 204 in FIG. 10 could carry out the appropriate despreading and joint detection operations. Many forms of joint signal detection, or joint demodulation, can be used, including maximum likelihood detection, decorrelation detection, and subtractive or interference cancellation techniques as noted above.

It will be appreciated by those of ordinary skill in this art that the foregoing methods and functions can be carried out by appropriately arranged, general-purpose, digital signal processor circuits and components. For better efficiency, however, specialized application-specific integrated circuits (ASICs) are preferred.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a system for communicating a sequence of information symbols, a transmitter comprising:

means for spreading each information symbol with a respective spreading sequence, thereby forming a sequence of spread symbols, wherein the spreading sequences are selected from a set of spreading sequences that are mutually orthogonal or bi-orthogonal;

means for scrambling each spread symbol with a common scramble mask, thereby producing a sequence of scrambled symbols, wherein the common scramble mask is selected from a set of scramble masks having optimal or semi-optimal correlation properties; and means for transmitting the sequence of scrambled symbols over a communication channel.

2. The transmitter of claim 1, wherein a modulo-2 sum of any two scramble masks is a sequence that is substantially equally correlated in magnitude to each of the spreading sequences.

3. The transmitter of claim 1, wherein a modulo-2 sum of any two scramble masks is a sequence that is substantially equally correlated in magnitude to each spreading sequence in a subset of the spreading sequences and that has substantially zero correlation with the remaining spreading sequences.

4. The transmitter of claim 1, wherein the optimal correlation properties include the property that a modulo-2 sum of any two scramble masks is a bent sequence.

5. The transmitter of claim 1, wherein the semi-optimal correlation properties include the property that a modulo-2 sum of any one two scramble masks is a partially bent sequence.

6. The transmitter of claim 1, wherein the spreading sequences are permutations of Walsh-Hadamard codewords.

7. The transmitter of claim 1, wherein the transmitting means includes means for further scrambling the scrambled symbols, thereby producing a sequence of further scrambled symbols, and means for transmitting the further scrambled symbols over the communication channel.

8. The transmitter of claim 1, wherein the spreading means spreads each information symbol of a plurality of sequences of information symbols with a respective spreading sequence, thereby forming a plurality of sequences of spread symbols;

the scrambling means scrambles each spread symbol in each sequence of spread symbols with a respective common scramble mask, thereby producing a plurality of sequences of scrambled symbols;

the transmitter further includes means for combining the plurality of sequences of scrambled symbols, thereby forming a sequence of combined scrambled symbols; and the transmitting means transmits the sequence of combined scrambled symbols over the communication channel.

9. The transmitter of claim 8, wherein the plurality of sequences of information symbols correspond to all information signals transmitted to a cell in a cellular communication system.

10. The transmitter of claim 8, wherein the plurality of sequences of information symbols correspond to a subset of all information signals transmitted to a cell in a cellular communication system.

11. The transmitter of claim 1, wherein the spreading means and the scrambling means are combined into a means for spreading and scrambling each information symbol with a respective effective spreading sequence, thereby forming a sequence of scrambled spread symbols;

the effective spreading sequences are selected from a set of effective spreading sequences, pairs of the effective spreading sequences either being mutually orthogonal or hi-orthogonal or having optimal or semi-optimal correlation properties; and the transmitting means transmits the scrambled spread symbols over the communication channel.

12. The transmitter of claim 11, wherein the spreading and scrambling means spreads each information symbol of a plurality of sequences of information symbols with a respective effective spreading sequence, thereby forming a plurality of sequences of scrambled spread symbols;

the transmitter further includes means for combining the plurality of sequences of scrambled spread symbols, thereby forming a sequence of combined scrambled spread symbols; and the transmitting means transmits the sequence of combined scrambled spread symbols over the communication channel.

13. The transmitter of claim 1, wherein the spreading means spreads each information symbol of a plurality of sequences of information symbols with a respective spreading sequence, thereby forming a plurality of sequences of spread symbols;

the transmitter further includes means for combining the plurality of sequences of spread symbols, thereby forming a sequence of combined spread symbols;

the scrambling means scrambles each combined spread symbol in the sequence of combined spread symbols with a common scramble mask, thereby producing a sequence of scrambled combined spread symbols; and the transmitting means transmits the sequence of scrambled combined spread symbols over the communication channel.

14. The transmitter of claim 1, further comprising:

means for converting the sequence of information symbols into a sequence of blocks of binary digits;

means for generating first pseudorandom numbers, each first pseudorandom number associated with a respective block, and for generating a second pseudorandom number;

means for combining the first pseudorandom numbers with the respective blocks, thereby generating a sequence of enciphered symbols; and means for offsetting the second pseudorandom number, thereby forming a scramble mask index;

wherein the spreading means spreads each enciphered symbol with a respective spreading sequence, thereby forming the sequence of spread symbols;

the scrambling means scrambles each spread symbol with the common scramble mask, thereby producing the sequence of scrambled symbols; and the scramble mask is selected based on the scramble mask index.

15. The transmitter of claim 14, wherein the second pseudorandom number depends on a multi-bit digital control signal and on the block corresponding to the spread symbol scrambled with the scramble mask selected based on the scramble mask index formed by offsetting the second pseudorandom number.

16. The transmitter of claim 14, wherein the combining means and the scrambling means are modulo-2 adders.

17. The transmitter of claim 14, wherein a modulo-2 sum of any two of the scramble masks is a sequence that is substantially equally correlated in magnitude to each of the spreading sequences.

18. The transmitter of claim 14, wherein a modulo-2 sum of any two of the scramble masks is a sequence that is substantially equally correlated in magnitude to each spreading sequence in a subset of the spreading sequences and that has substantially zero correlation with the remaining spreading sequences.

19. In a system for communicating sequences of information symbols, a receiver comprising:

means for receiving a composite signal including a plurality of spectrally overlapping sequences of spread, scrambled information symbols;

means for descrambling the composite signal with a scramble mask selected from a set of scramble masks having optimal or semi-optimal correlation properties, thereby producing a sequence of descrambled symbols;

means for despreading the sequence of descrambled symbols using spreading sequences, including means for correlating at least one shift of each descrambled symbol with at least one of the spreading sequences, thereby producing at least one correlation value for each descrambled symbol, wherein the spreading sequences are mutually orthogonal or bi-orthogonal; and means for processing the correlation values to detect at least one sequence of information symbols.

20. The receiver of claim 19, wherein the processing means includes a coherent RAKE combiner.

21. The receiver of claim 19, wherein the processing means includes a non-coherent RAKE combiner.

22. The receiver of claim 19, wherein the descrambling means produces a plurality of sequences of descrambled symbols, each sequence of descrambled symbols corresponding to a respective sequence of information symbols;

the despreading means produces at least one correlation value from each descrambled symbol by correlating at least one shift of each descrambled symbol with at least one respective spreading sequence; and the processing means processes the correlation values to detect the plurality of sequences of information symbols.

23. The receiver of claim 19, wherein the descrambling means and the despreading means are combined into means for descrambling and despreading the composite signal with an effective spreading sequence selected from a set of effective spreading sequences, thereby producing the correlation values; and pairs of the effective spreading sequences either have optimal or semi-optimal correlation properties or are mutually orthogonal or hi-orthogonal.

24. The receiver of claim 23, wherein the descrambling and despreading means descrambles and despreads the composite signal with at least one effective spreading sequence selected from a set of effective spreading sequences, thereby producing correlation values for a plurality of sequences of information symbols;

each selected effective spreading sequence corresponds to a respective sequence of information symbols; and pairs of the effective spreading sequences either have optimal or semi-optimal correlation properties or are mutually orthogonal or bi-orthogonal.

25. The receiver of claim 19, wherein the composite signal includes a plurality of spectrally overlapping sequences of enciphered, spread, scrambled information symbols;

the receiver further comprises means for generating a scramble mask address and for selecting, based on the scramble mask address, a scramble mask from the set of scramble masks having optimal or semi-optimal correlation properties;

the descrambling means descrambles the composite signal with the selected scramble mask, thereby producing the sequence of descrambled symbols;

the processing means processes the correlation values to detect at least one sequence of enciphered information symbols; and the receiver further comprises means for deciphering the at least one sequence of enciphered information symbols detected by the processing means using a pseudorandom number associated with the respective information symbols.

26. A method of transmitting a sequence of information symbols comprising the steps of:

spreading each information symbol with a respective spreading sequence, thereby forming a sequence of spread symbols, wherein the spreading sequences are selected from a set of spreading sequences that are mutually orthogonal or bi-orthogonal;

scrambling each spread symbol with a common scramble mask, thereby producing a sequence of scrambled symbols, wherein the common scramble mask is selected from a set of scramble masks having optimal or semioptimal correlation properties; and transmitting the sequence of scrambled symbols over a communication channel.

27. The method of claim 26, wherein a modulo-2 sum of any two scramble masks is a sequence that is substantially equally correlated in magnitude to each of the spreading sequences.

28. The method of claim 26, wherein a modulo-2 sum of any two scramble masks is a sequence that is substantially equally correlated in magnitude to each spreading sequence in a subset of the spreading sequences and that has substantially zero correlation with the remaining spreading sequences.

29. The method of claim 26, wherein the optimal correlation properties include the property that a modulo-2 sum of any two scramble masks is a bent sequence.

30. The method of claim 26, wherein the semi-optimal correlation properties include the property that a modulo-2 sum of any one two scramble masks is a partially bent sequence.

31. The method of claim 26, wherein the spreading sequences are permutations of Walsh-Hadamard codewords.

32. The method of claim 26, wherein the transmitting step includes the steps of further scrambling the scrambled symbols, thereby producing a sequence of further scrambled symbols, and transmitting the sequence of further scrambled symbols over the communication channel.

33. The method of claim 26, wherein each information symbol of a plurality of sequences of information symbols is spread with a respective spreading sequence, thereby forming a plurality of sequences of spread symbols;

each spread symbol in each sequence of spread symbols is scrambled with a respective common scramble mask, thereby producing a plurality of sequences of scrambled symbols;

the method further includes the step of combining the plurality of sequences of scrambled symbols, thereby forming a sequence of combined scrambled symbols; and the sequence of combined scrambled symbols is transmitted over the communication channel.

34. The method of claim 33, wherein the plurality of sequences of information symbols correspond to all information signals transmitted to a cell in a cellular communication system.

35. The method of claim 33, wherein the plurality of sequences of information symbols correspond to a subset of all information signals transmitted to a cell in a cellular communication system.

36. The method of claim 26, wherein the spreading step and the scrambling step are combined into a step of spreading and scrambling each information symbol with a respective effective spreading sequence, thereby forming a sequence of scrambled spread symbols;

the effective spreading sequences are selected from a set of effective spreading sequences, wherein pairs of the effective spreading sequences either are mutually orthogonal or bi-orthogonal or have optimal or semi-optimal correlation properties; and the scrambled spread symbols are transmitted over the communication channel.

37. The method of claim 36, wherein the spreading and scrambling step spreads each information symbol of a plurality of sequences of information symbols with a respective effective spreading sequence, thereby forming a plurality of sequences of scrambled spread symbols;

the method further includes the step of combining the plurality of sequences of scrambled spread symbols, thereby forming a sequence of combined scrambled spread symbols; and the sequence of combined scrambled spread symbols is transmitted over the communication channel.

38. The method of claim 26, wherein the spreading step spreads each information symbol of a plurality of sequences of information symbols with a respective spreading sequence, thereby forming a plurality of sequences of spread symbols;

the method further includes the step of combining the plurality of sequences of spread symbols, thereby forming a sequence of combined spread symbols;

each combined spread symbol in the sequence of combined spread symbols is scrambled with a common scramble mask, thereby producing a sequence of scrambled combined spread symbols; and the sequence of scrambled combined spread symbols is transmitted over the communication channel.

39. The method of claim 26, further comprising the steps of:

converting the sequence of information symbols into a sequence of blocks of binary digits;

generating first pseudorandom numbers and a second pseudorandom number, each first pseudorandom number being associated with a respective block;

combining the first pseudorandom numbers with the respective blocks, thereby generating a sequence of enciphered symbols; and offsetting the second pseudorandom number, thereby forming a scramble mask index;

wherein each enciphered symbol is spread with a respective spreading sequence, thereby forming the sequence of spread symbols;

each spread symbol is scrambled with the common scramble mask, thereby producing the sequence of scrambled symbols; and the scramble mask is selected based on the scramble mask index.

40. The method of claim 39, wherein the second pseudorandom number depends on a multi-bit digital control signal and on the block corresponding to the spread symbol scrambled with the scramble mask selected based on the scramble mask index formed by offsetting the second pseudorandom number.

41. The method of claim 39, wherein each of the combining step and the scrambling step are a step of modulo-2 addition.

42. The method of claim 39, wherein a modulo-2 sum of any two of the scramble masks is a sequence that is substantially equally correlated in magnitude to each of the spreading sequences.

43. The method of claim 39, wherein a modulo-2 sum of any two of the scramble masks is a sequence that is substantially equally correlated in magnitude to each spreading sequence in a subset of the spreading sequences and that has substantially zero correlation with the remaining spreading sequences.

44. A method of detecting information symbols comprising the steps of:
   receiving a composite signal including a plurality of spectrally overlapping sequences of spread, scrambled information symbols;
   descrambling the composite signal with a scramble mask selected from a set of scramble masks having optimal or semi-optimal correlation properties, thereby producing a sequence of descrambled symbols;
   despreading the descrambled symbols using spreading sequences, including the steps of correlating at least one shift of each descrambled symbol with at least one of the spreading sequences, thereby producing at least one correlation value for each descrambled symbol, wherein the spreading sequences are mutually orthogonal or bi-orthogonal; and
   processing the correlation values to detect at least one sequence of information symbols.

45. The method of claim 44, wherein the processing step includes a coherent RAKE combining step.

46. The method of claim 44, wherein the processing step includes a non-coherent RAKE combining step.

47. The method of claim 44, wherein the descrambling step produces a plurality of sequences of descrambled symbols, each sequence of descrambled symbols corresponding to a respective sequence of information symbols;
   the despreading step produces at least one correlation value from each descrambled symbol by correlating at least one shift of each descrambled symbol with at least one respective spreading sequence; and
   the correlation values are processed to detect the plurality of sequences of information symbols.

48. The method of claim 44, wherein the descrambling step and the despreading step are combined into a step of descrambling and despreading the composite signal with an effective spreading sequence selected from a set of effective spreading sequences, thereby producing the correlation values; and
   pairs of the effective spreading sequences either have optimal or semi-optimal correlation properties or are mutually orthogonal or bi-orthogonal.

49. The method of claim 48, wherein the descrambling and despreading step descrambles and despreads the composite signal with at least one effective spreading sequence selected from a set of effective spreading sequences, thereby producing correlation values for a plurality of sequences of information symbols;
   each selected effective spreading sequence corresponds to a respective sequence of information symbols; and
   pairs of the effective spreading sequences either have optimal or semi-optimal correlation properties or are mutually orthogonal or bi-orthogonal.

50. The method of claim 44, wherein the composite signal includes a plurality of spectrally overlapping sequences of enciphered, spread, scrambled information symbols;
   the method further comprises the steps of generating a scramble mask address; and
   selecting, based on the scramble mask address, a scramble mask from the set of scramble masks having optimal or semi-optimal correlation properties;
   the composite signal is descrambled with the selected scramble mask, thereby producing the sequence of descrambled symbols;
   the correlation values are processed to detect at least one sequence of enciphered information symbols; and
   the method further comprises the step of deciphering at least one detected sequence of enciphered information symbols using a pseudorandom number associated with the respective information symbols.

* * * * *